United States Patent [19]
Sato et al.

[11] Patent Number: 5,095,203
[45] Date of Patent: Mar. 10, 1992

[54] ARTICLE DETECTION DEVICE AND METHOD WITH SHIFT REGISTERS AND SAMPLING

[75] Inventors: Shinichi Sato, Kawasaki; Takeshi Ishii, Ichikawa; Tamotsu Takahashi, Shiki; Yoshihiro Oyama, Koriyama; Tatsuo Sasaki, Tokyo; Mitsuo Watanabe, Yokohama; Ichiro Shinoda, Kawasaki; Hiroaki Katoh, Sagamihara; Nobuyuki Kitamura, Zama; Motohiko Ito, Tokyo; Tomoyuki Kashiwazaki, Kawasaki; Hiroaki Kawai, Yokohama, all of Japan

[73] Assignee: Fujitsu Limited, Kawasaki, Japan

[21] Appl. No.: 598,162

[22] Filed: Oct. 16, 1990

[30] Foreign Application Priority Data

Oct. 16, 1989 [JP] Japan .................. 1-268416
Oct. 16, 1989 [JP] Japan .................. 1-268418
Oct. 16, 1989 [JP] Japan .................. 1-268419
Oct. 16, 1989 [JP] Japan .................. 1-268420
Oct. 16, 1989 [JP] Japan .................. 1-268421

[51] Int. Cl.$^5$ .................. G01V 9/04; H01J 40/14; G06K 7/10
[52] U.S. Cl. .................. 250/222.1; 250/221; 250/214 B; 250/566
[58] Field of Search .................. 250/222.1, 221, 223 R, 250/224, 214 B, 214 AG, 214 AL, 561, 566, 568; 340/555, 556, 557

[56] References Cited

U.S. PATENT DOCUMENTS

| 4,061,925 | 12/1977 | van der Gaag et al. | 250/214 B |
| 4,315,159 | 2/1982 | Niwa et al. | 250/208.1 |
| 4,681,432 | 7/1987 | Kawabata et al. | 250/214 B |
| 4,694,182 | 9/1987 | Howard | 250/566 |
| 4,840,069 | 6/1989 | Hampton et al. | 250/214 B |
| 4,879,461 | 11/1989 | Philipp | 250/222.1 |

FOREIGN PATENT DOCUMENTS 323848 1/1988 European Pat. Off. .
2114792 1/1983 United Kingdom .

OTHER PUBLICATIONS

IBM Technical Disclosure Bulletin, Sep. 1989, vol. 32, No. 4B, N.Y., U.S., p. 15.

Primary Examiner—David C. Nelms
Assistant Examiner—Michael Messinger
Attorney, Agent, or Firm—Staas & Halsey

[57] ABSTRACT

An article detection device includes: a light emission unit for emitting a detection light for irradiation onto an article, and a light reception unit for receiving a light reflected from the article. The article detection device also includes; an analog-to-digital converter for converting the reflected light to a digital signal, a first register for storing the digital signal after being sampled using a first sampling signal having a first period, and a second register for storing the digital signal after being sampled using a second sampling signal having a second period shorter than the first period. The article detection device further includes a control unit for generating the first and second sampling signals to be sent to the first and second registers, reading the digital signal stored in the first and second registers, calculating a difference between the digital signals in the first register and second register, comparing an absolute value of the difference with a predetermined threshold value, and detecting the article when the absolute value is larger than the threshold value.

18 Claims, 14 Drawing Sheets

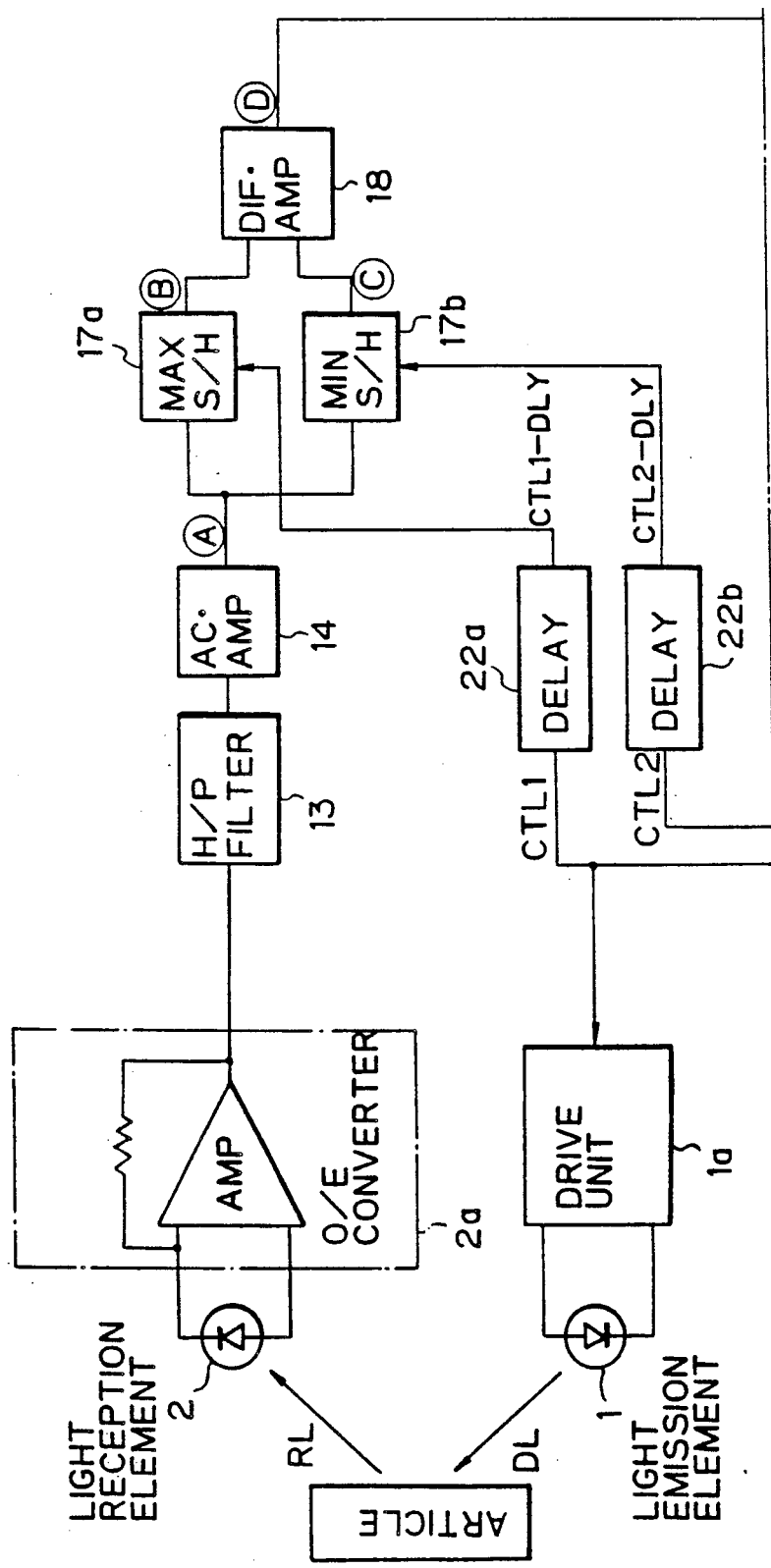

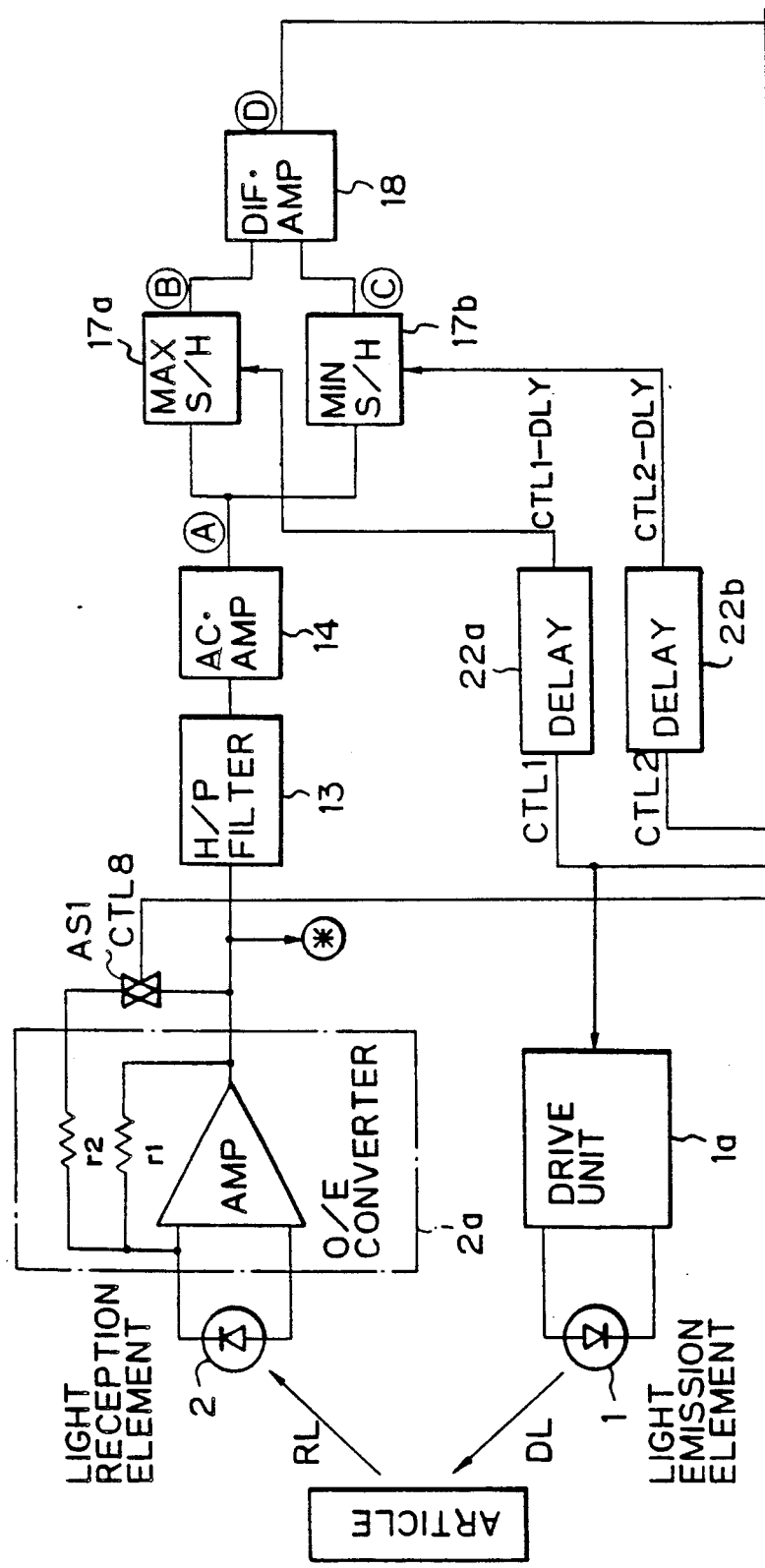

ARTICLE DETECTION DEVICE AND METHOD WITH SHIFT REGISTERS AND SAMPLING

BACKGROUND OF THE INVENTION

1. Field of the Invention

The present invention relates to an article detection device and a method for detecting the article, more particularly, it relates to an article detection device used with a bar code reader.

2. Description of the Related Art

Recently, bar code readers are widely utilized for management of goods in a POS (Point Of Sales) system. In general, there are two types of bar code readers, i.e., an installed type and a handheld type. The former is large and installed in a counter of a large store. This type has a plurality of scanning beams (laser beams) to be irradiated onto a bar code symbol so that it is possible to provide highly precise detection of the bar code symbol regardless of a direction of entry of the article into a scanning area of the laser beam. Further, in general, this type has an article detection device for detecting the entry of the article into the scanning area of the laser beam before the laser beam is activated. Since the laser beam is activated after detection of the article, it is possible to extend the life of a laser beam source.

In general use, the operator sits next to a bar code reader. However, the light reflected from the operator should not be detected as an article by the article detection device. Further, random external light (ambient light), for example, fluorescent lamps and sunlight, exists around the article, and the light reflected from the operator and the ambient light have an undesirable influence on the detection of the bar code symbol.

Accordingly, it is necessary to eliminate the influence of this reflected light to increase the precision of the detection of the bar code symbol.

SUMMARY OF THE INVENTION

The object of the present invention is to provide an article detection device and a method for detecting the article enabling highly precise article detection regardless of the influence of ambient light reflected from various sources.

In accordance with the present invention, there is provided an article detection device including: a light emission unit for emitting a detection light onto an article; a light reception unit for receiving light reflected from the article; an analog-to-digital converter coupled to the light reception means for converting the reflected light to a digital signal; a first register coupled to the analog-to-digital converter, for storing the digital signal after being sampled using a first sampling signal having a first period; a second register coupled to the analog-to-digital converter, for storing the digital signal after being sampled using a second sampling signal having a second period shorter than the first period; and a control unit for generating the first and second sampling signals to be provided to the first and second registers, reading the digital signal stored in the first and second registers, calculating a difference between the digital signals in the first register and second register, comparing an absolute value of the difference with a predetermined threshold value, and detecting the article when the absolute value is larger than a threshold value.

In one embodiment, the article detection device further comprises: an alternating amplifier (AC-amplifier) connected to a light reception unit for amplifying the reflected light to provide an alternating signal; a sample/hold unit connected between the AC-amplifier and the A/D converter for sampling and holding an alternating signal provided by the AC-amplifier; and a modulation unit for generating a pulse modulation signal to be sent to a drive unit which pulse-drives the light emission unit; wherein the control unit further generates first, second and third control signals to control the modulation unit, the sample/hold unit, and the A/D converter respectively.

In another embodiment, the control unit comprises a storage unit for storing first and second numbers of sampling times and storing a threshold value comprised of first and second threshold values.

In still another embodiment, the sample/hold unit comprises a maximum sample/hold circuit for sampling and holding a maximum value of the alternating signal, a minimum sample/hold circuit for sampling and holding a minimum value of the alternating signal, and a differential amplifier for amplifying a difference between the outputs of the maximum sample/hold circuit and the minimum sample/hold circuit.

In still another embodiment, the sample/hold unit further comprises a first delay unit for delaying a first sampling signal, and a second delay unit for delaying a second sampling signal, the first sampling signal is input to the maximum sample/hold circuit, and the second sampling signal is input to the minimum sample/hold circuit.

In still another embodiment, an article detection device further comprises: a difference calculation unit having a differential amplifier for calculating a difference between a background reflected light and a lower limitation level to provide a resultant data, the background reflected light being detected from the background of the article, and the lower limitation level being adjusted in accordance with the intensity of the background reflected light in an adjusting mode; and detection means for detecting a change in amount of light based on the resultant data of the above calculation to eliminate the influence of the ambient light.

In still another embodiment, the intensity of the background reflected light is determined by a reference reflection face having a predetermined reflection rate.

In still another embodiment, the article detection device comprises a sample/hold circuit for sampling and holding the output of the differential amplifier, to provide an output, an adjusting circuit for adjusting the lower limitation level, a first A/D converter for converting the output of the differential amplifier to a digital value, a second A/D converter for converting the output of the sample/hold circuit to a digital value, and a third A/D converter for converting the output of the adjusting circuit to a digital value.

In still another embodiment, the light reception unit receives ambient light, the light reception unit includes a light reception element, and the article detection device further comprises an amplifier coupled to the light reception element an adjusting unit for adjusting the gain of an amplifier connected to the light reception element; and a reference voltage generation unit for generating first and second reference voltages to be supplied to the amplifier. The adjustment of the gain of the amplifier is performed in such a way that when an ambient light does not exceed a predetermined threshold level, the first reference voltage is selected and the gain is adjusted to a high level and when the ambient light does exceed a predetermined threshold level, the second reference voltage is selected and the gain is adjusted to a low level.

In still another embodiment, the adjusting unit comprises a first analog switch for switching the gain between the high level and the low level, second and third analog switches for switching between detection of ambient light and the light reflected from an article, and fourth and fifth analog switches being used for switching the reference voltage between the first and the second reference voltages. The switching of these analog switches is performed by selection signals generated by the control unit.

In still another embodiment, the control unit comprises a microprocessor.

As another aspect of the present invention, a method for detecting an article comprises the steps of: emitting a detection light to be irradiated onto an article; receiving light reflected from the article; converting the light reflected to a digital signal; storing the digital signal in a first register after being sampled using a first sampling signal generated by the control unit and having a first period; and storing the digital signal in a second register after being sampled using a second sampling signal generated by the control unit and having a second period shorter than the first period. The method also comprises the steps of: reading the digital signal stored in the first and second registers; calculating a difference between the digital signals in the first register and second register; comparing an absolute value of the difference with a first predetermined threshold value; and detecting the article when the absolute value is larger than the first threshold value.

In another embodiment, the method further comprises the step of: not detecting an article when the absolute value is not larger than a second threshold value.

In still another embodiment, the detecting step further comprises the steps of: checking whether a number of sampling times reaches a predetermined number of sampling times when the absolute value is smaller than the first threshold value, and returning to previous sampling steps.

In still another embodiment, the method further comprises the steps of: checking whether the number of sampling times reaches a predetermined number of sampling times when the absolute value is larger than the second threshold value, returning to a previous sample step of the second sampling signal when the number of sampling times does not reach a predetermined number of sampling times, and not detecting the article when the absolute value is smaller than the second threshold value or when the number of sampling times reaches a predetermined number of times.

In still another embodiment, a method for detecting an article further comprises the steps of: setting first and second reference voltages, detecting ambient light before detecting the article; comparing the ambient light with a second predetermined threshold value; and adjusting a gain of an amplifier in accordance with the ambient light; and switching between first and second reference voltages.

In still another embodiment, a method for detecting an article further comprises the steps of: calculating a difference between a background reflected light and a lower limitation level in an adjusting mode to provide resultant data and detecting a change in amount of light based on resultant data from a previous step to eliminate the influence of the ambient light.

BRIEF DESCRIPTION OF THE DRAWINGS

In the drawings:
FIGS. 7A and 7B are a detailed block diagram of the second embodiment of FIG. 6A;
FIGS. 9A and 9B are a detailed block diagram of a third embodiment of the present invention.

DESCRIPTION OF THE PREFERRED EMBODIMENTS

Before describing the preferred embodiment, an explanation will be given of the conventional art.

Figure 1A:
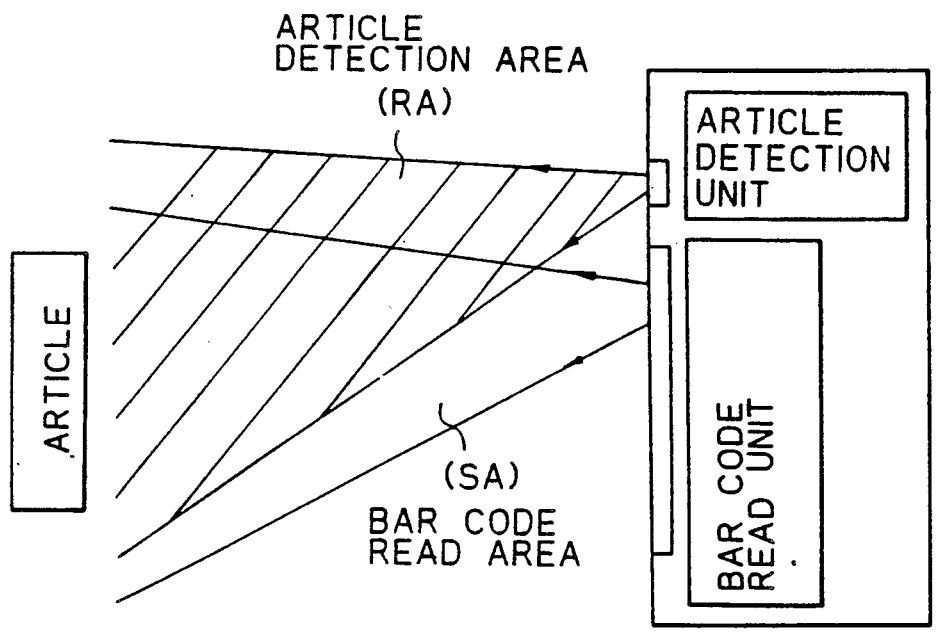
FIG. 1A is a view for explaining an article detection area and a bar code read area of a bar code reader.

FIG. 1A is a view for explaining an article detection area and a bar code read area of a bar code reader. As shown in the drawing, the bar code reader is basically constituted by an article detection unit and a bar code read unit. An article detection light is emitted from the article detection unit in the range of the article detection area (slanted area) to detect an article. The laser beam is emitted from the bar code read unit to read the bar code symbol of the article. The article detection area RA overlaps with the bar code read area SA to realize precise detection of the article. When the article detection unit detects an article in the article detection area RA, the laser beam source is turned on and the laser beam is emitted onto the bar code symbol.

Figure 1B:
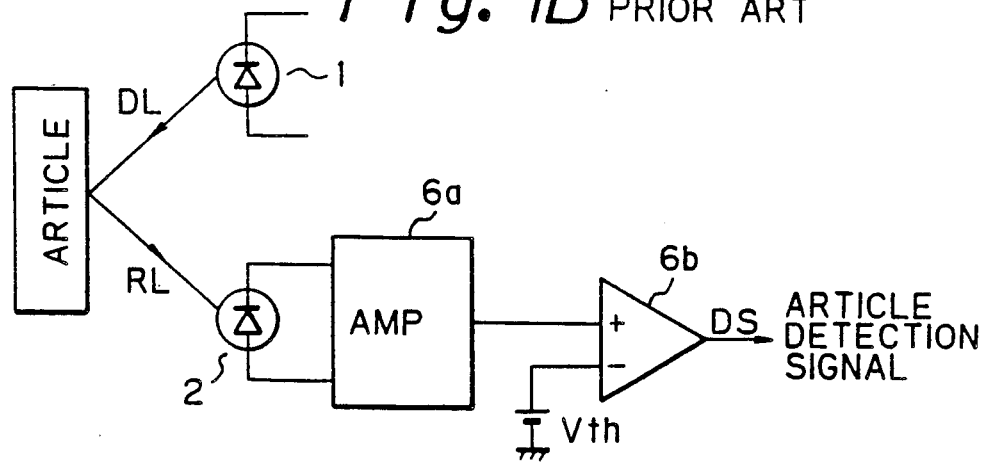
FIG. 1B is a basic circuit of an article detection unit of FIG. 1A.

FIG. 1B is a basic circuit of the article detection unit shown in FIG. 1A. The detection light DL is emitted from the light emission element 1, and the light reflected from the article RL is received by the light reception element 2 and amplified by the amplifier 6a. In the comparator 6b, the amplified signal is compared with the threshold level Vth and the article detection signal DS is output when the amplified signal is larger than the threshold level Vth.

Figure 1C:
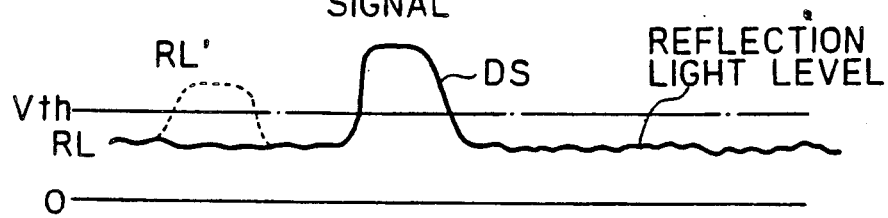
FIG. 1C is a view for explaining an article detection signal from a comparator shown in FIG. 1B.

FIG. 1C is a view for explaining an article detection signal DS from the comparator 6b. As shown in the drawing, when the reflected light level RL exceeds the threshold level Vth, the article detection signal DS is emitted from the comparator 6b. That is, although various detection lights are reflected from the article and the background, the light level reflected from the article itself is larger than the threshold level Vth.

In this case, the reflection light level RL fluctuates in accordance with a color in the background. For example, when the operator wears white, the reflected light level RL becomes large. Accordingly, when the reflected light from the background accidentally exceeds the threshold level Vth as shown by dotted line RL', the undesired reflected light RL' is detected as the article detection signal.

Figure 2A:
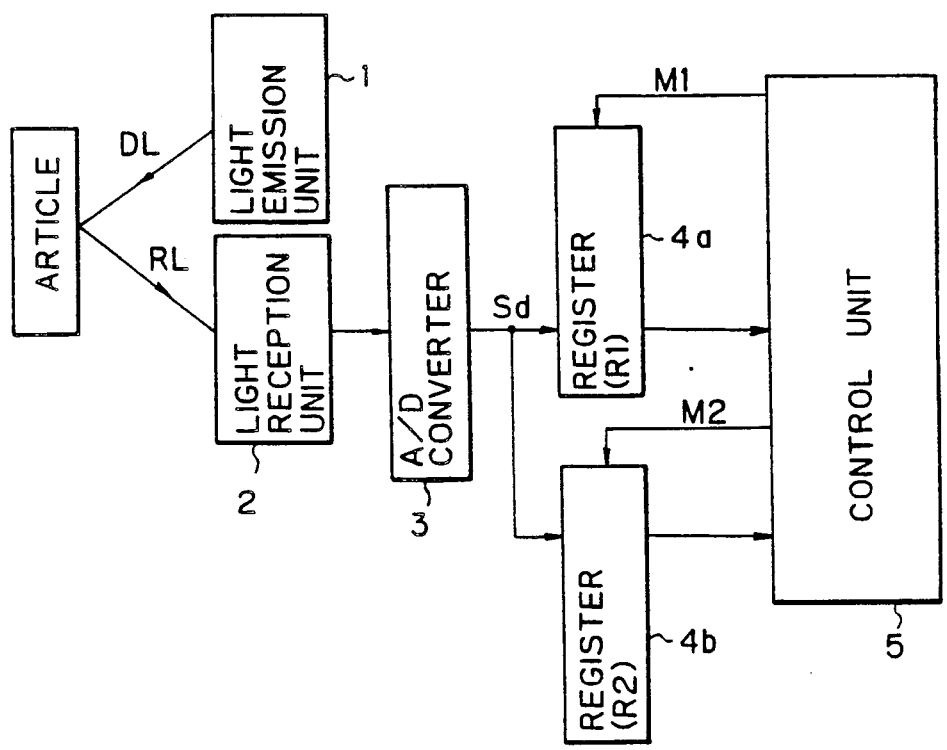
FIG. 2A is a basic block diagram of an article detection device according to a first embodiment of the present invention.

FIG. 2A is a basic block diagram of an article detection device according to a first embodiment of the present invention. In FIG. 2A, the same reference numbers as used in FIG. 1A are attached to the same components in this drawing. Reference number 3 denotes an analog-to-digital converter, 4a and 4b denote registers, and 5 denotes a control unit. Further, M1 denotes a first sampling signal, and M2 denotes a second sampling signal. The signal Sd from the A/D converter is input in parallel to the first register 4a and the second register 4b.

The first register 4a stores the signal Sd after being sampled using the sampling signal M1 having a first period T1, and the second register 4b stores the signal Sd after being sampled using the sampling signal M2 having a second period T2. The period of the sampling signal M2 is shorter than that of the sampling signal M1. The control unit 5 generates the first and second sampling signals M1 and M2 which are applied to the first and second registers 4a and 4b. Further, the control unit 5 calculates the difference between the data stored in the first and second registers 4a and 4b, compares the absolute value of that difference with the threshold value, and detects the article when the absolute value exceeds the threshold value.

Figure 2B:
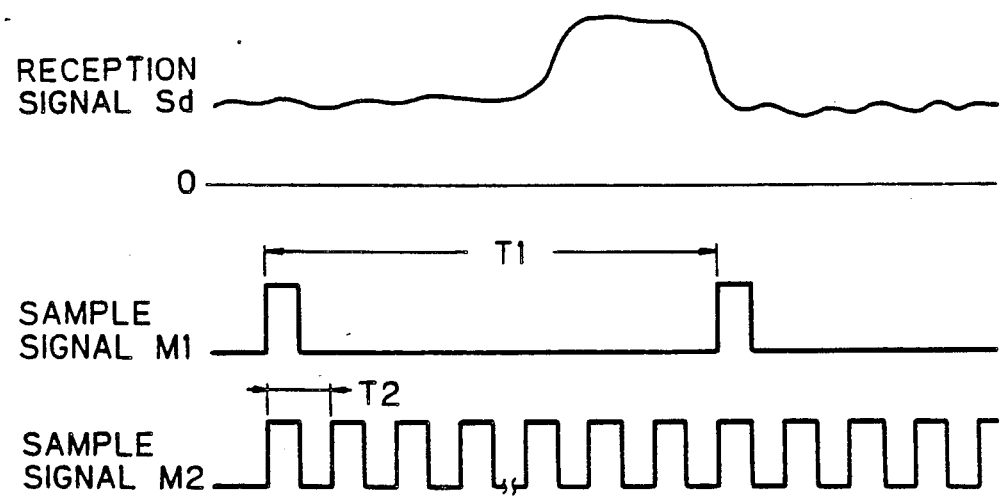
FIG. 2B is a signal timing chart of the article detection device of FIG. 2A.

FIG. 2B is a signal timing chart of the device shown in FIG. 2A. As shown in the drawing, the period T2 of the sampling signal M2 is considerably shorter than that of the sampling signal M1. For example, the period T1 may be set to 5 sec, and the period T2 set to 2 msec. The light reflected from the background is detected during the period T1 of the sampling signal M1, and the light reflected from the article is detected during the period T2 of the sampling signal M2. Accordingly, as explained in detail hereinafter, the article is detected when the absolute value of the difference between the reflection level of the background and that of the article exceeds the predetermined threshold value.

Figure 3:
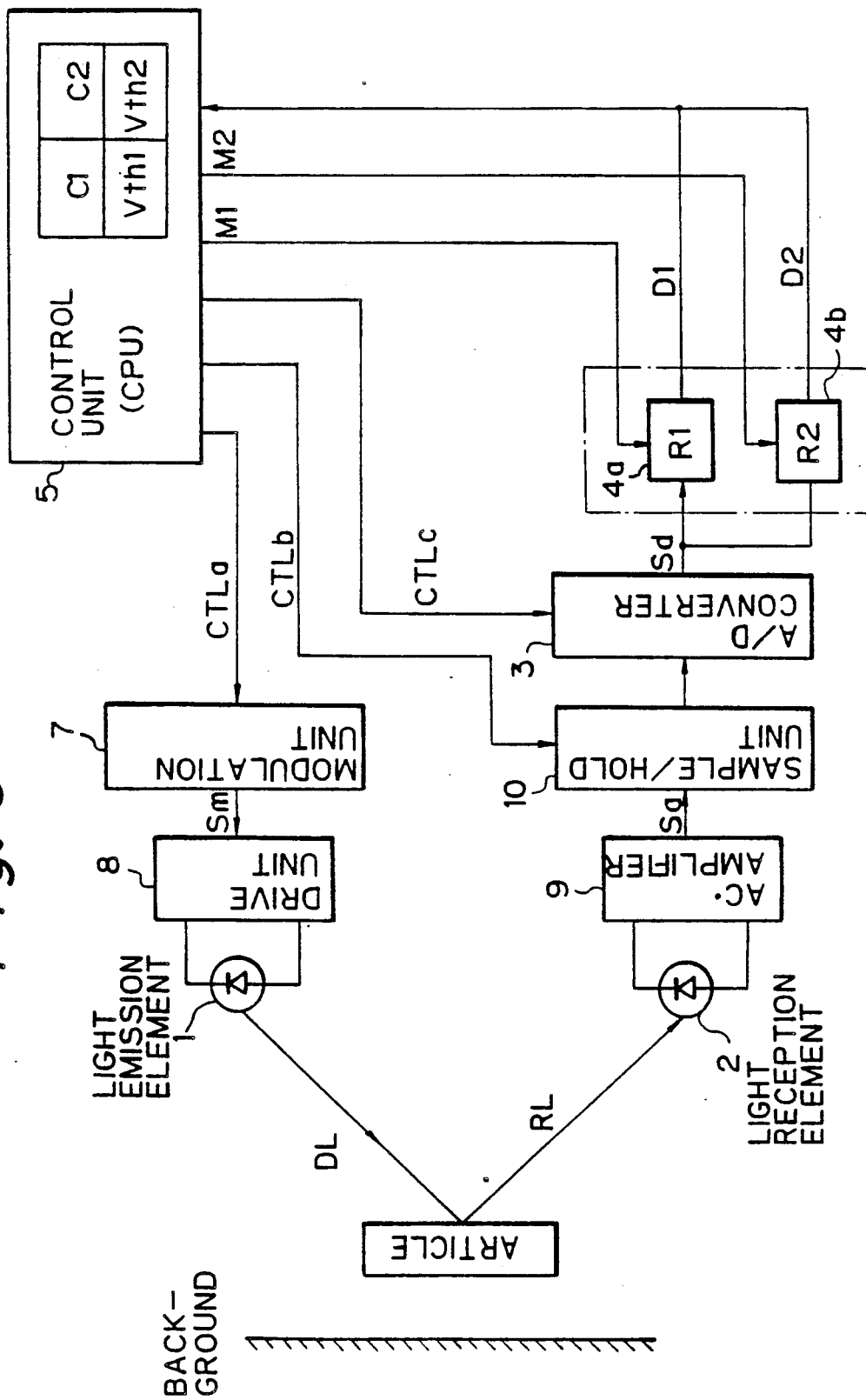
FIG. 3 is a detailed block diagram of the article detection device of FIG. 2A.

FIG. 3 is a detailed block diagram of the article detection device of FIG. 2A. Reference number 7 denotes a modulation unit, 8 denotes a drive unit, 9 denotes an alternating (AC) amplifier, and 10 denotes a sample/hold unit. Further, CTLa to CTLc denote control signals generated from the control unit 5 to control the operation of the units 3, 7, and 10, C1 and C2 denote the number of sampling times, Vth1 denotes a threshold level when an article is present, and Vth2 denotes a threshold level when an article is not present. These values of C1, C2 and Vth1, Vth2 are stored in a storage means of the control unit 5.

The modulation unit 7 generates a pulse modulation signal Sm to the drive unit 8 in response to the control signal CTLa. The drive unit 8 drives the light emission element 1 in response to the pulse modulation signal Sm so that a pulsed detection light DL is emitted from the element 1.

The reflection light RL from the article is received by the light reception element 2 and alternatively amplified by the AC-amplifier 9. The amplified signal Sa is input to the sample/hold unit 10 for sampling and holding the amplified signal. The control unit 5 is constituted by, for example, a microprocessor (CPU).

Since the detection light DL is emitted in pulses, it is possible to extend the life of the element 1, and to reduce power consumption.

Figure 4:
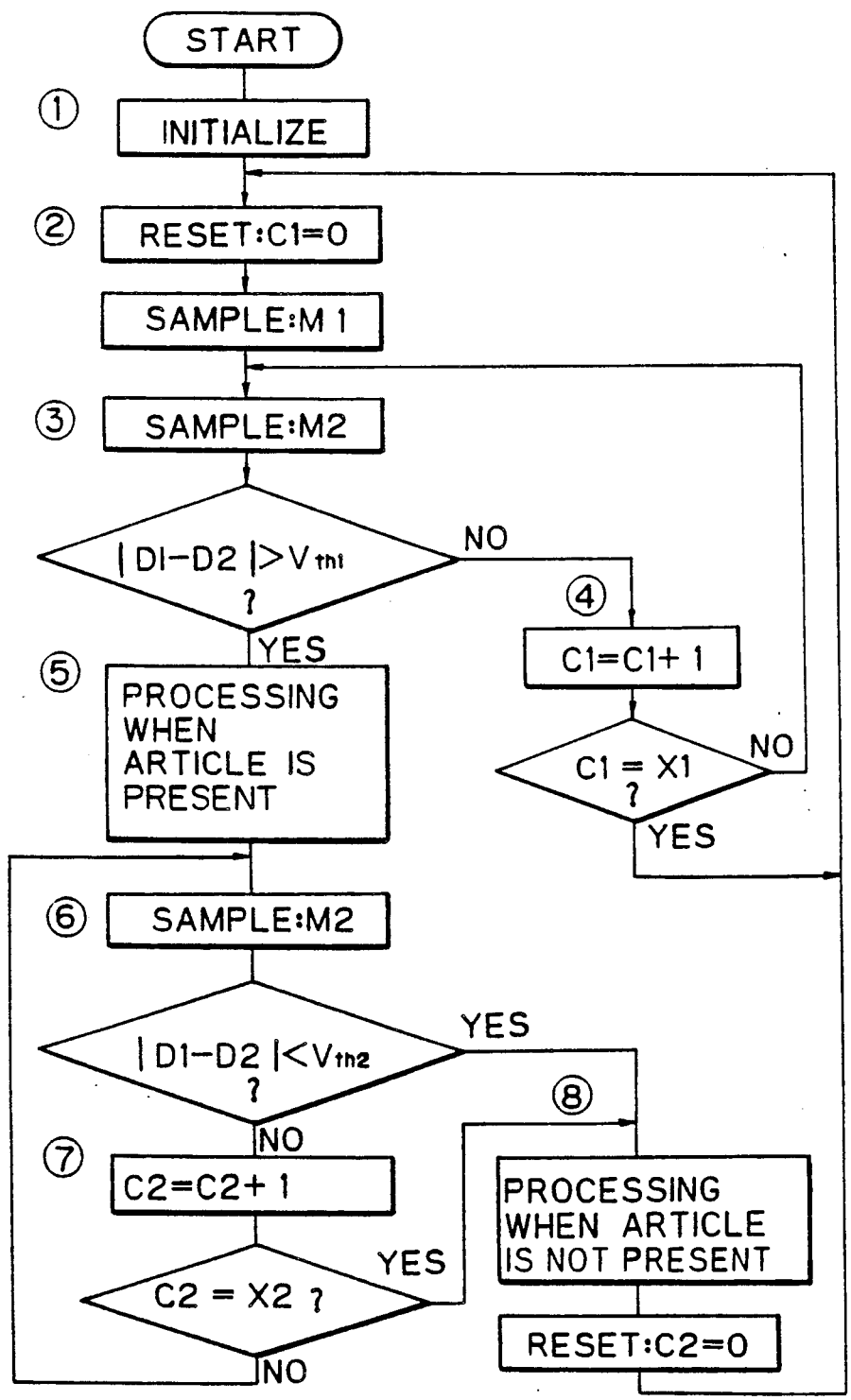
FIG. 4 is a flowchart for explaining processing of signals in the circuit of FIG. 3.

FIG. 4 is a flowchart for explaining the processing of signals in the circuit shown in FIG. 3.

① First, the CPU initializes each unit.

② Next, the CPU resets the number of times C1 of the sampling signal M1 to "0". Further, the digital signal Sd is input to the first register 4a in response to the sampling period of the sampling signal M1.

③ The CPU sends the sampling signal M2 to the second register 4b. The digital signal Sd is input to the second register 4b in response to the period of the sampling signal M2.

Next, the CPU reads the sampling data D1 using the sampling signal M1 from the first register 4a and the sampling data D2 using the sampling signal M2 from the second register 4b. Further, the CPU calculates the difference between the sampling data D1 and the sampling data D2 (i.e., D1−D2), obtains the absolute value |D1−D2| of the difference, and compares the absolute value |D1−D2| with the threshold value Vth1.

④ In step ③, when the absolute value |D1−D2| is not larger than the first threshold value Vth1 ("NO"), the CPU judges that an article is not detected, and updates the number of times C1 of the sampling to C1+1. The CPU then checks whether or not the number of times C1 has reached the predetermined number of times X1. When the number of times C1 reaches X1, i.e., C1=X1 ("YES"), the process returns to the step ② to start from C1=0. If the number of times C1 has not reached X1, i.e., C1≠X1 ("NO"), the process returns to the step ③ to read the data D1.

⑤ In step ③, when the absolute value |D1−D2| is larger than the first threshold value Vth1 ("YES"), the CPU judges that an article is present, and performs the processing for the case in which an article is present. That is, the CPU starts the bar code read unit to irradiate the laser beam onto the bar code.

⑥ The CPU then again reads the data D2 in the period T2 from the register 4b to ensure precise detection of the article. That is, the CPU again calculates the difference between the sampling data D1 and the sampling data D2 (i.e., D1−D2), obtains the absolute value |D1−D2|, and compares the absolute value |D1−D2| with the second threshold value Vth2.

⑦ In step 6, when the absolute value |D1−D2| is not smaller than the second threshold value Vth2 ("NO"), the CPU judges that an article may be present in the detection area, and updates the number of times C2 of the sampling to C2+1. The CPU then checks whether or not the number of times C2 has reached the predetermined number of times X2. If the number of times C2 has not reached X2, i.e., C2≠X2 ("NO"), the process returns to the step ⑥ to repeat from the step ⑥. When the number of times C2 reaches X2, i.e., C2=X2 ("YES"), the process proceeds to the step ⑧. In this case, the CPU judges that the article is present, but it has not moved into detection area.

⑧ In step ⑥, when the absolute value |D1−D2| is smaller than the second threshold value Vth2 ("YES"), and when the article is present, but it has not moved into the detection area, the CPU performs the processing for the case in which no article is present in the detection area. That is, the CPU resets the number of times C2 of the sampling to "0", and the process returns to the step ②.

Figure 5A:
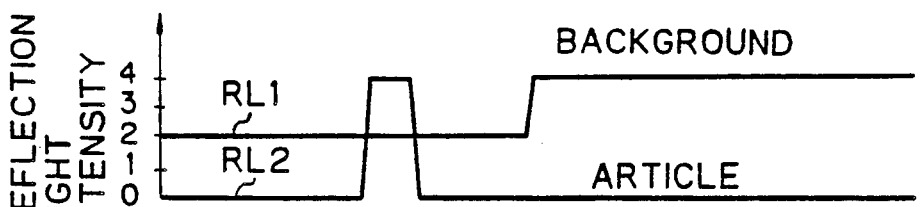
FIGS. 5A, 5B, 5C, 5D, 5E, and 5F are signal timing charts according to the present invention.

FIGS. 5A to 5F are signal timing charts of the present invention. In FIG. 5A, the ordinate denotes the intensity of light reflected from the background or an article. The article detection unit detects the reflected light RL1 of the background changing from intensity "2" to intensity "4", and also detects the reflected light RL2 of the article changing from intensity "0" to intensity "4". In this case, the change of the reflection light intensity RL2 of the article is quite large because the article is present in front of the article detection unit for every reading operation.

Figure 5B:
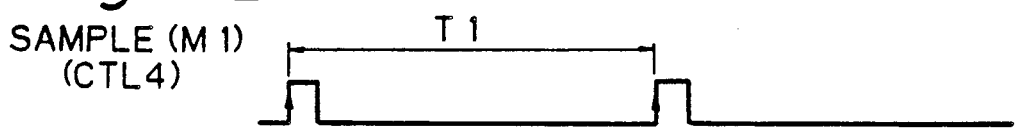
Figure 5C:

In FIGS. 5B and 5C, the period T1 of the sampling signal M1 is very large compared with the period T2 of the sampling signal M2. As explained above, for example, the period T1 is set to 5 sec, and the period T2 is set to 2 msec. In this case, the period T1 is used for sampling the light reflected from the background, and period T2 is used for sampling the light reflected from the article.

Figure 5D:
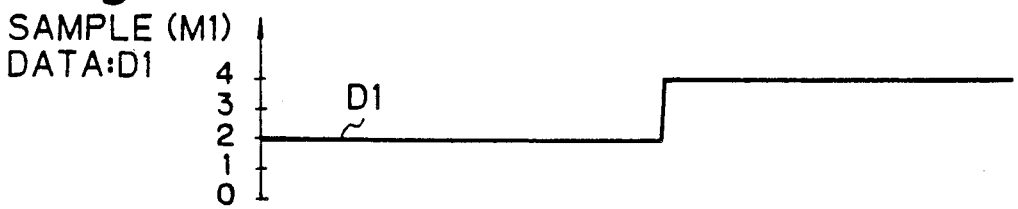
Figure 5E:
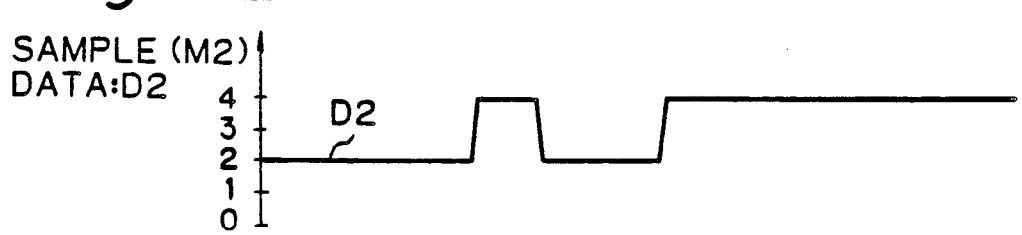

In FIGS. 5D and 5E, the data D1 denotes the sampling data stored in the register (R1) 4a based on the period T1, and the data D2 denotes the sampling data stored in the register (R2) 4a based on the period T2.

Figure 5F:
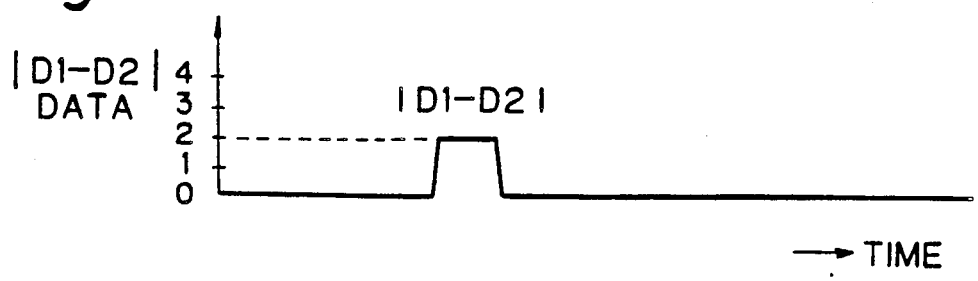

In FIG. 5F, this chart shows the absolute value of the difference between the data D1 and the data D2. That is, the CPU subtracts the data D2 from the data D1, and obtains absolute value |D1−D2|. Further, the absolute value |D1−D2| is compared with the predetermined threshold value.

Accordingly, in the present invention, since two different sampling periods T1 and T2 are used for detecting the background and the article and the absolute value |D1−D2| is compared with the first and second threshold values Vth1 and Vth2, it is possible to eliminate the influence of the light reflected from the background so that it is possible to perform precise detection of the article. Further, as shown in step ⑧, when the CPU judges that an article exists but does not move, since the CPU performs the processing for the base in which no article is present, it is possible to reduce the necessary time for detecting the article.

The article detection unit according to the present invention can of course be applied to another type of system instead of a bar code reader.

Figure 6A:
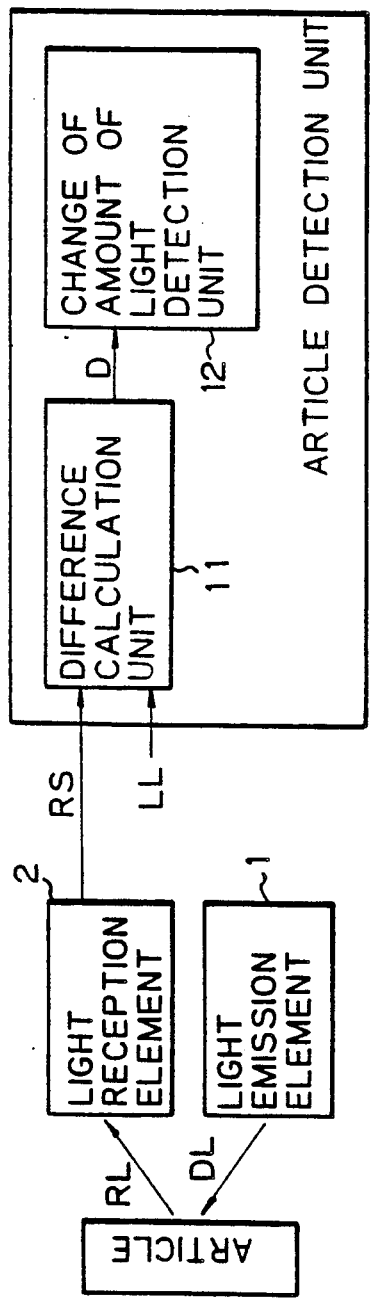
FIG. 6A is a basic block diagram of an article detection unit according to a second embodiment of the present invention.

FIG. 6A is a basic block diagram of the article detection unit according to a second embodiment of the present invention. This embodiment is advantageous for detection of an article in a case where the background moves. In FIG. 6A, reference number 11 denotes a difference calculation unit, and 12 denotes a a change of amount of light detection unit. These units are provided in the article detection unit. Briefly, the difference calculation unit 11 substracts a lower limitation level LL from the background reflected light RS and obtains a difference value D thereof. The change of amount of light detection unit 12 detects the change in the amount of light based on the difference light value D as explained in detail hereinafter.

Figure 6B:
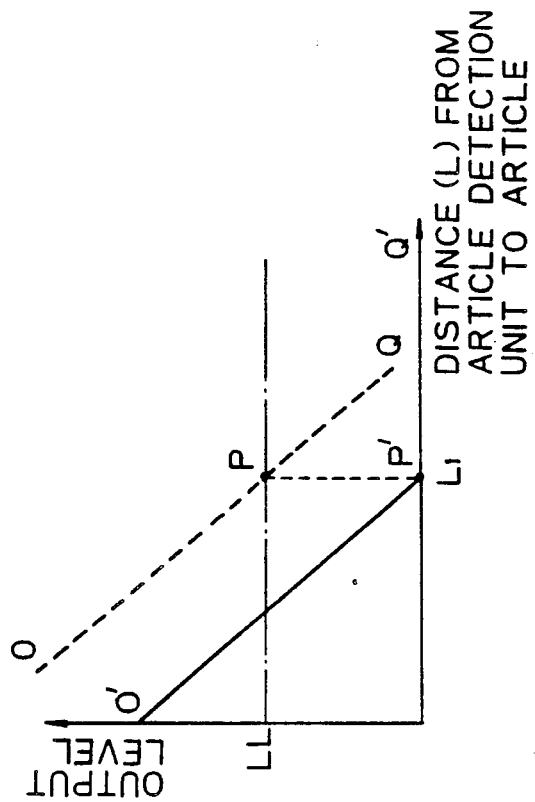
FIG. 6B is a view for explaining the principle of the second embodiment.

FIG. 6B is a view for explaining the principle of the second embodiment. In FIG. 6B, the ordinate denotes the output level of the light reception element, and the abscissa denotes the distance from the article to the article detection unit. The line O-P-Q (dotted line) denotes the relationship between the output and the distance. As is obvious from the drawing, the output level linearly reduces in proportion to the distance. In this case, the lower limitation level is defined by movement of the background as explained below.

When the output level (i.e., reflected light level) is limited by the lower limitation level LL, the output light lower than the limitation level LL is not detected by the article detection unit. Accordingly, the light to be detected by the article detection unit can be expressed by the line O′—P′—Q′ (solid line). In other words, it is possible to consider that the distance from the article to the article detection unit is close to a distance L1. Therefore, it is possible to eliminate a light reflected from the background which moves in the detection area.

Figure 7B:
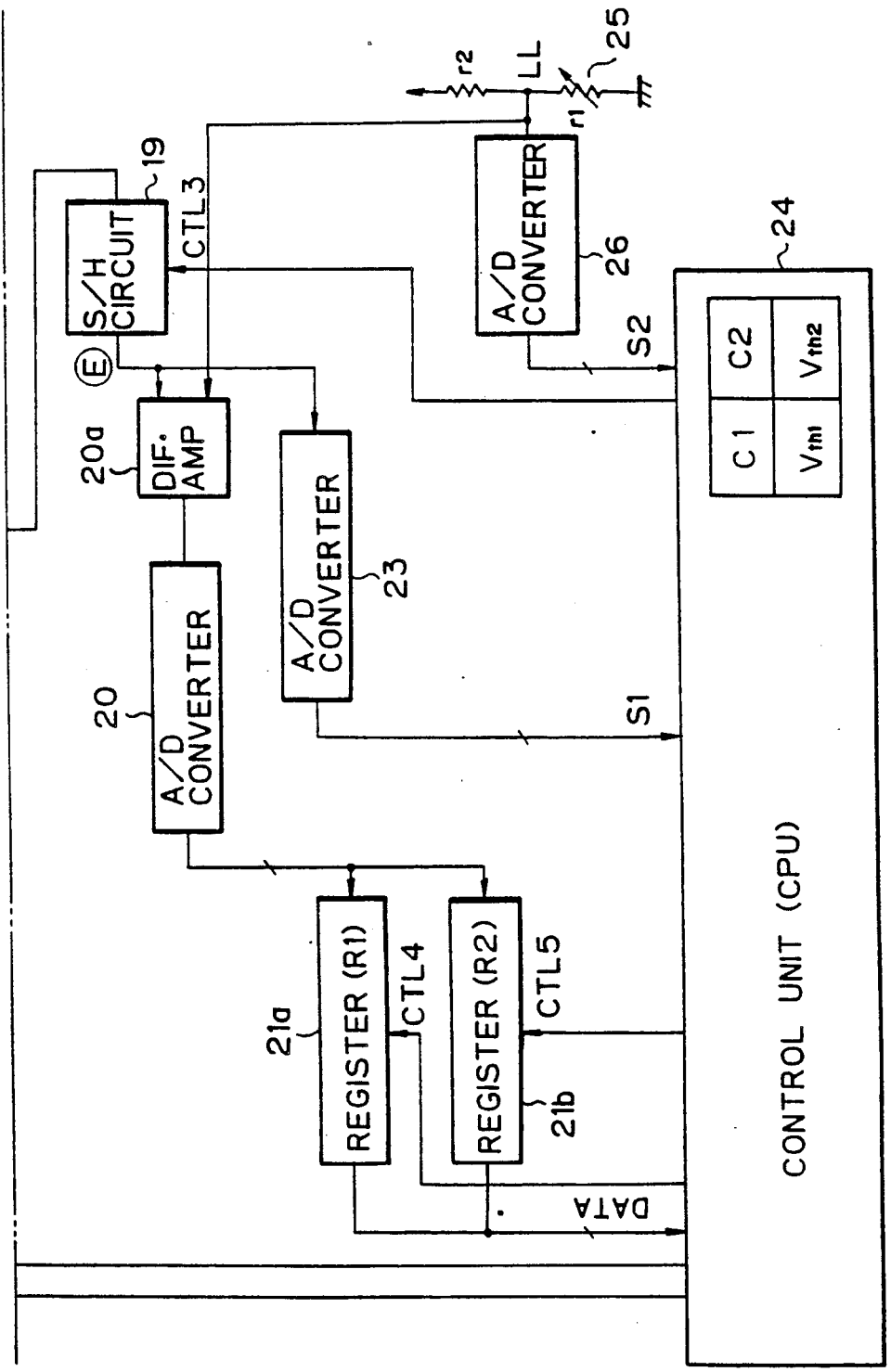
Figure 8:
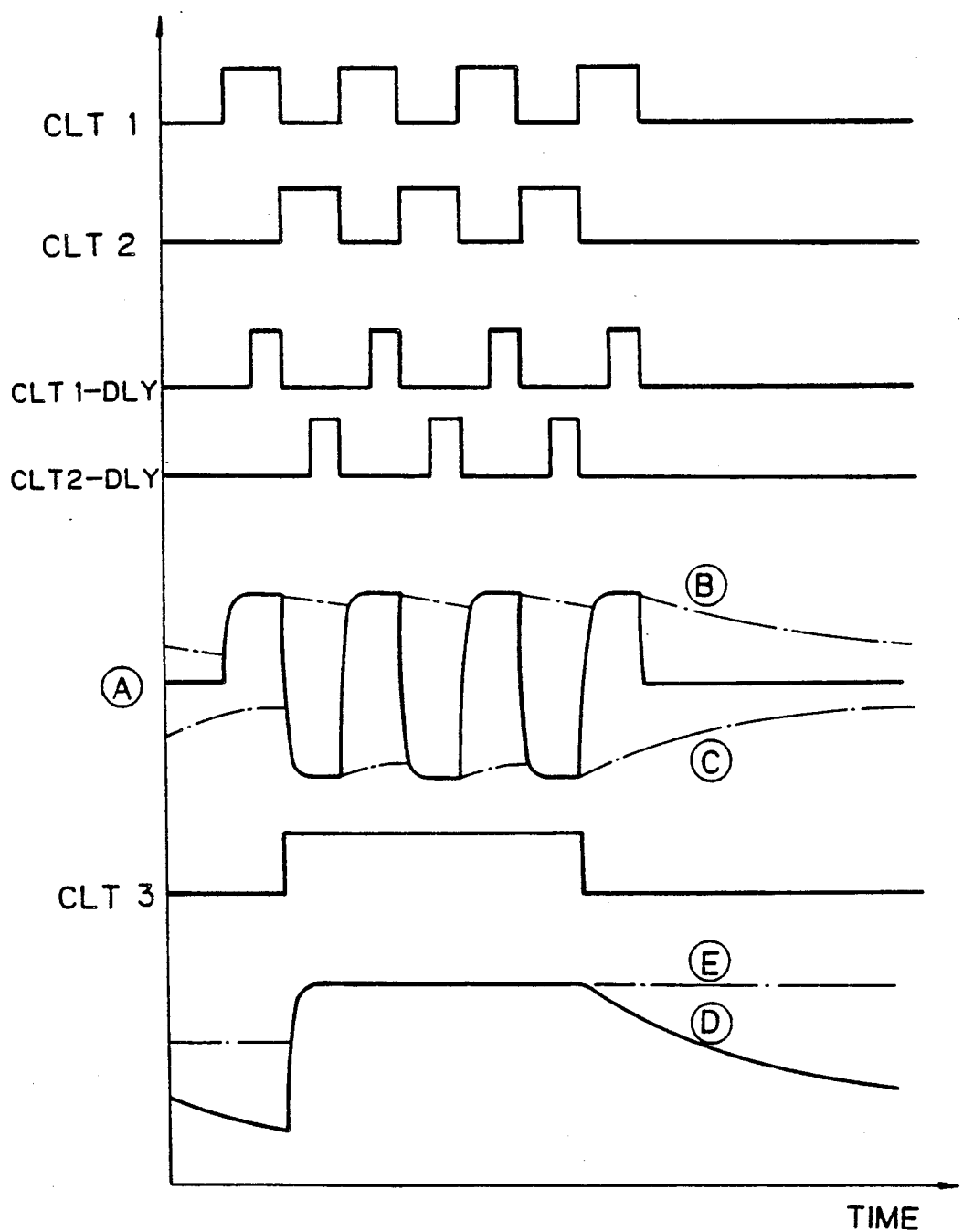
FIG. 8 is a timing diagram of the waveforms of each block of FIGS. 7A and 7B.

FIGS. 7A and 7B are a detailed block diagram of the second embodiment shown in FIG. 6A, and FIG. 8 is a timing diagram of the waveforms of each block of FIGS. 7A and 7B.

In FIGS. 7A and 7B, reference number 2a denotes an optical-to-electrical (O/E) converter, and 13 a high-pass (H/P) filter. 17a denotes a maximum sample/hold (S/H) circuit, 17b a minimum sample/hold circuit, 18 and 20a denote differential amplifiers (DIF-AMP), 19 denotes a sample/hold circuit, and 22a and 22b denote delay circuits. The registers 21a and 21b correspond to the registers 4a and 4b in FIG. 3, and the CPU 24 corresponds to the control unit 5 in FIG. 3. Further, reference number 25 denotes an adjusting circuit for the lower limitation level, and 26 denotes an A/D converter.

The signal A amplified by the AC amplifier 14 is input to the maximum and minimum sample/hold circuits 17a and 17b. The signal A is shown by the solid line in FIG. 8, and the signals B and C are shown by the dotted lines in FIG. 8. The maximum sampling/holding operation is performed in response to a sample/hold signal CTL1-DLY generated from the delay circuit 22a, and the minimum sampling/holding operation is performed in response to a sample/hold signal CTL2-DLY generated from the delay circuit 22b. Signals CTL1 and CTL2 are the sample/hold signals before being delayed by the delay circuits. The signals CTL1 and CTL2 are generated from the CPU 24.

In this case, each pulse width of the CTL1-DLY and the CTL2-DLY is narrower than that of the CTL1 and CTL2. This is because it is necessary to use the flat portion of the signal A. That is, the signal CTL1-DLY synchronizes with the signal A, and is used for sampling the maximum range (flat portion) of the reflection light of the signal A. Similarly, the signal CTL2-DLY synchronizes with the signal A, and is used for sampling the minimum range (flat portion) of the reflection light of the signal A.

The differential amplifier 18 amplifies the difference value between the signals B and C and obtains the signal D shown in FIG. 8. The sample/hold circuit 19 outputs the signal E in response to the sample/hold signal CTL3 from the CPU 24. The differential amplifier 20a calculates the difference between the signal E and the lower limitation level LL, and the difference value is converted to a digital signal by the A/D converter 20.

The register 21a stores the digital signal in response to the sampling signal CTL4 from the CPU, and the register 21b stores the digital signal in response to the sampling signal CTL5 from the CPU. The adjusting circuit 25 is constituted by a resistor variable r1 and a resistor r2, and is provided for adjusting the lower limitation level by means of the variable resistor R1.

The adjustment of the lower limitation level is explained in detail hereinafter. The lower limitation level LL is adjusted before the detection of the article is started (i.e., adjustment mode). The signal E is converted to the digital signal S1 by the A/D converter 23 and the digital signal S1 is input to the CPU as the adjustment mode. In the adjustment mode, the detection light DL is emitted in pulses from the light emission element 1. Next, a reference reflection face (not shown) is provided instead of the article at the distance L1 (for example, L1=40 cm) from the article detection unit. The reference reflection face has a reference reflection rate (for example, 30%). The detection light DL is reflected by the reference reflection face, and received by the light reception element 2. The received signal is transferred to the sample/hold circuit 19 through the units 13, 14, 17a, 17b, and 18.

The digital signal S1 from the A/D converter 23 is displayed on a display apparatus (not shown). The lower limitation level LL is adjusted by the variable resistor r1 in reference to the display. Further, the lower limitation level LL is converted to a digital signal S2 by the A/D converter 26 and displayed on the display apparatus. Accordingly, the operator adjusts the variable resistor r1 (signal S2) so as to coincide with the digital signal S1 of the A/D converter 23. The adjusted lower limitation level LL indicates the reflected light level from the background.

Figure 9B:
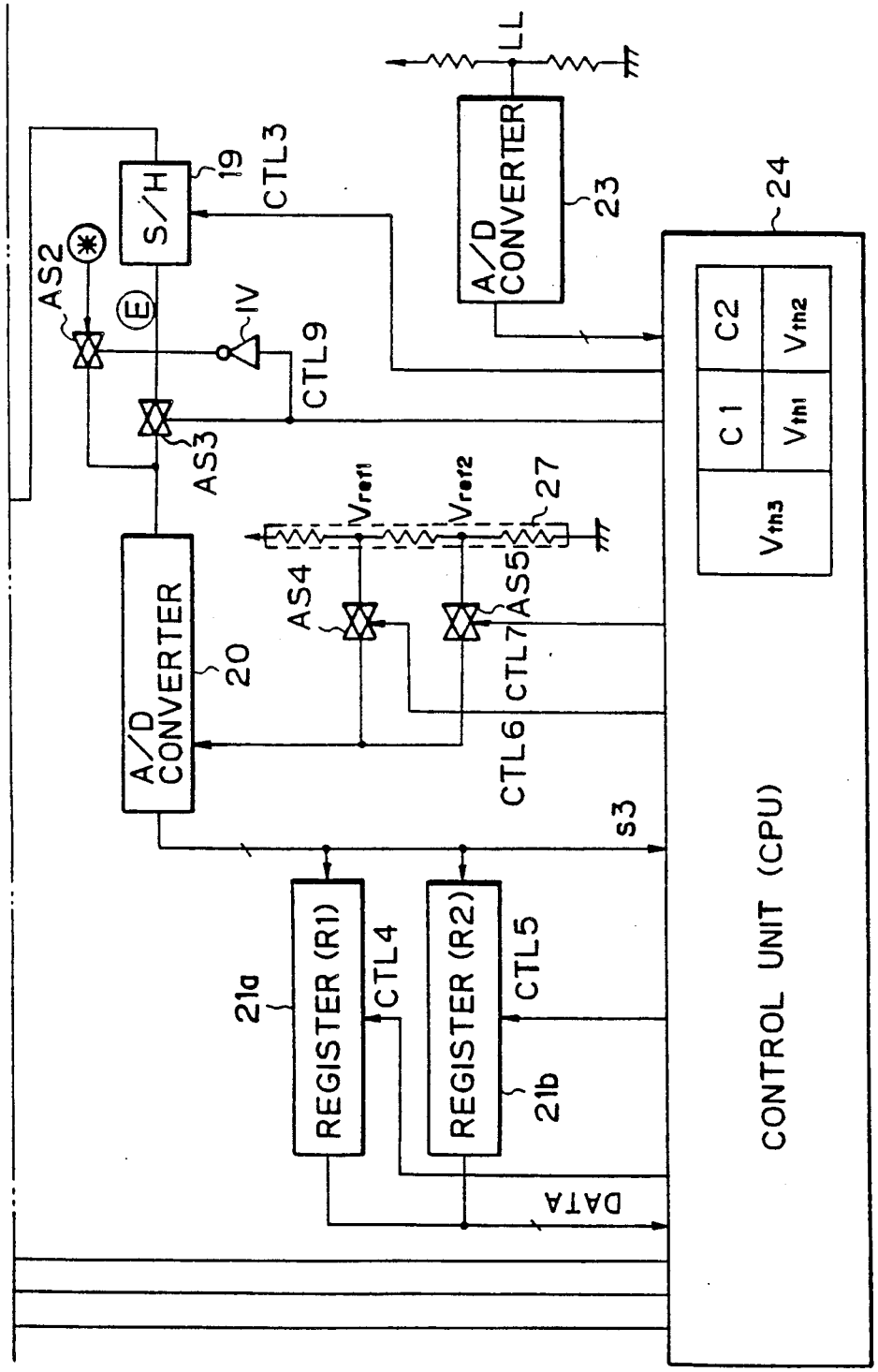

FIGS. 9A and 9B are a detailed block diagram of a third embodiment of the present invention. The same reference numbers as used in FIGS. 7A and 7B are attached to the same components in this drawing. This embodiment is provided as a countermeasure for ambient light, for example, fluorescent light and sunlight existing in the article detection area. When this ambient light is strong, the light reflected from the article is disturbed so that it is not possible to precisely detect the article.

In FIGS. 9A and 9B, AS1 to AS5 denote analog switches, and 27 denotes a reference voltage generation circuit. Further, Vref1 and Vref2 denote first and second reference voltages, and IV an inverter. The analog switch AS1 is provided for adjusting the gain of the amplifier (AMP) 2a by switching between the resistor r1 and the resistor r2. This switching operation is performed by a selection signal CTL8 from the CPU 24 in response to the intensity of the ambient light. The output of the amplifier 2a is input to the analog switch AS2 shown by a symbol , as well as to Filter 13. The high-pass H/P filter 13 is provided for cutting the DC components or low frequency components contained in the ambient light.

The analog switch AS2 is switched by a selection signal CTL9 after being inverted by the inverter IV. The output of the amplifier 2a is input to the A/D converter 20 through the analog switch AS2. The analog switch AS3 is switched by the selection signal CTL9 and the signal E is input to the A/D converter 20 through the analog switch AS3.

Figure 10:
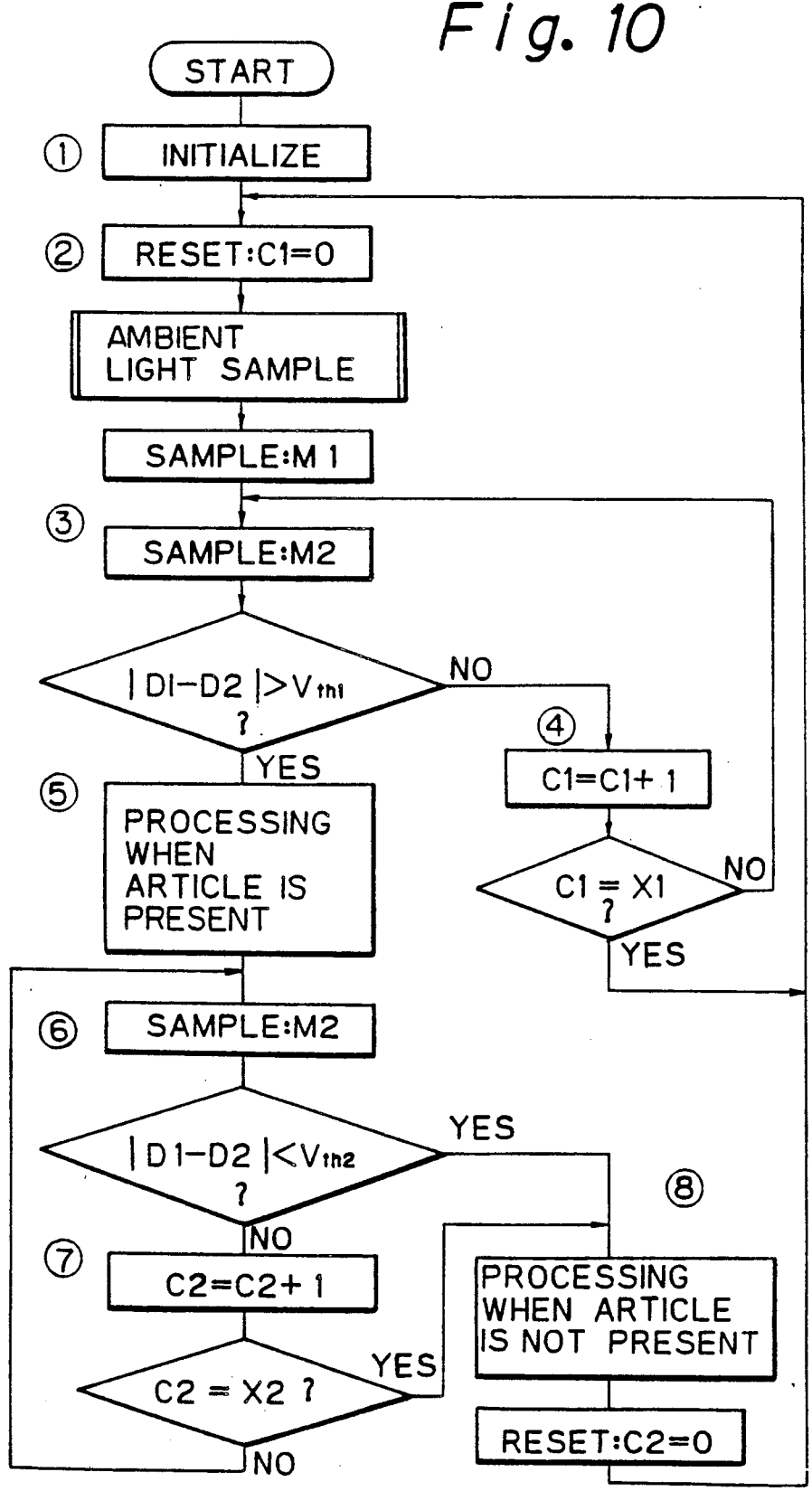
FIG. 10 is a flowchart for explaining a processing of signals in the circuit of FIG. 9.

FIG. 10 is a flowchart for explaining the processing of signals in the circuit shown in FIGS. 9A and 9B. This flowchart is the same as shown in FIG. 4 except for the step ②. Accordingly, an explanation is given of the step ②, and explanation of other steps is omitted. In step ②, the CPU resets the number of times C1 of the sampling signal M1 to "0". Next, the CPU performs the processing of the ambient light as explained in detail in FIG. 11, and performs the selection of the gain of the amplifier 2a and the selection of the reference voltage of the A/D converter 20. Further, the digital signal from the A/D converter 20 is input to the first register 21a in response to the sampling signal CTL4.

Figure 11:
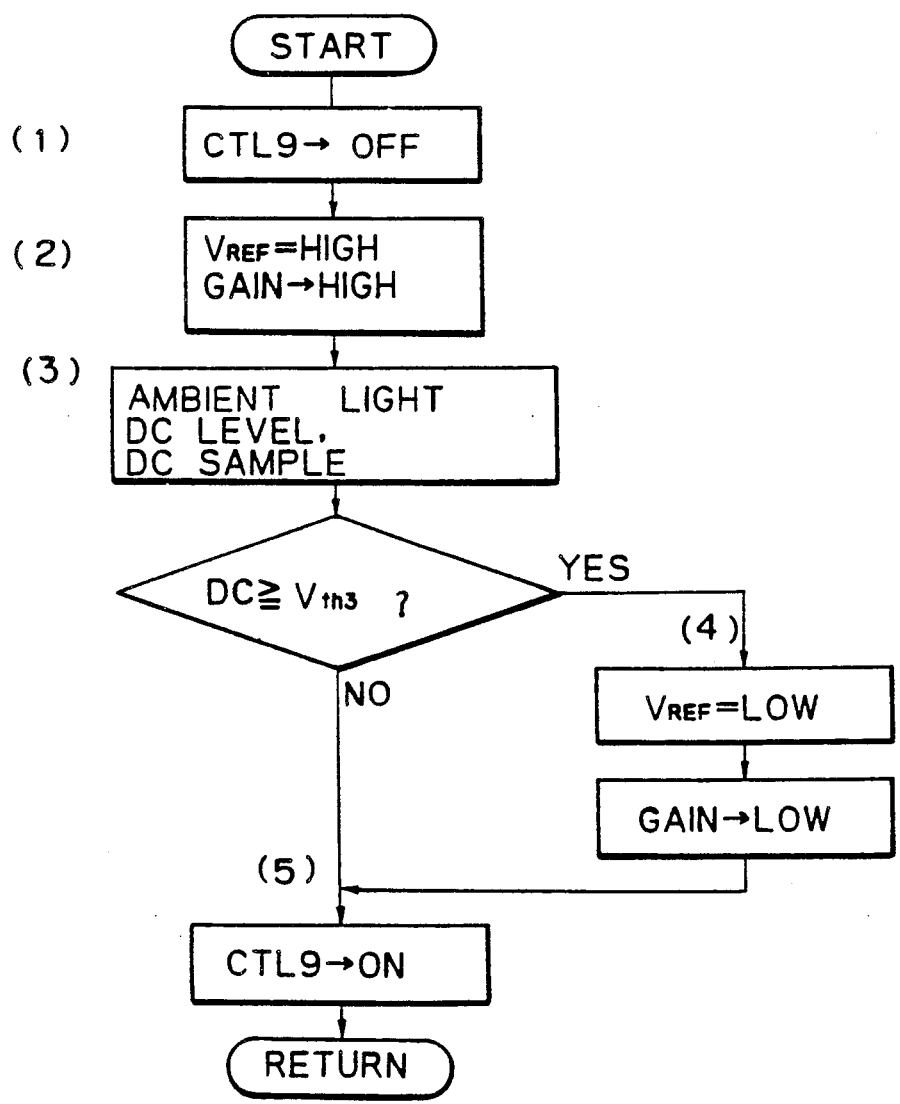
FIG. 11 is a flowchart for explaining the processing of ambient light of FIG. 10.
Figure 12:
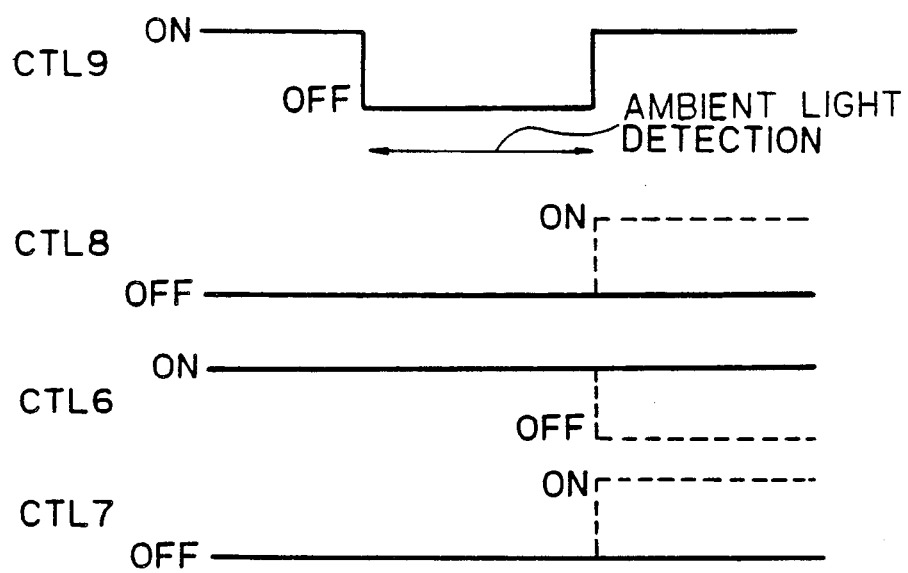
FIG. 12 shows the timing of selection signals of the circuit of FIG. 9.

FIG. 11 is a flowchart for explaining the processing of the ambient light shown in FIG. 10, and FIG. 12 is a timing of selection signals. The operation is explained in detail with reference to FIGS. 9A, 9B, 11 and 12.

(1) The CPU 24 turns off the selection signal CTL9 which is input to the analog switches AS2 and AS3. Accordingly, the analog switch AS3 is turned off, but the analog switch AS2 is turned on because the selection signal CTL9 is inverted by the inverter IV. Accordingly, the output of the amplifier 2a is input to the A/D converter 20. During this time, the detection light DL is not emitted from the light emission element 1. Accordingly, the light reception element 2 receives only ambient light from the background. This ambient light is input to the A/D converter 20 through the analog switch AS2 (through the symbol ), and converted to the digital signal S3 thereby.

(2) Next, the CPU 24 turns on the selection signal CTL6, and turns off the selection signal CTL7. Based on the selection signals CTL6 and CTL7, the analog switch AS4 is turned on and the analog switch AS5 is turned off. Accordingly, the reference voltage Vref1 having high voltage is applied to the A/D converter 20. At the same time, the CPU 24 turns off the selection signal CTL8 so as to turn off the analog switch AS1. Since the resistor r2 is cut off from a feedback loop of the amplifier the gain of the amplifier 2a is increased because only resistor r1 exists in the feedback loop.

(3) In above situation, the CPU 24 reads the sampling signal S3, which indicates the intensity of the ambient light, from the A/D converter 20. Further, the CPU compares the sampling signal S3 with a threshold value Vth3 of the ambient light.

(4) When the sampling signal S3 exceeds the threshold value Vth3 ("YES"), it is possible to consider that the intensity of the ambient light is larger than the threshold value Vth3. Accordingly, the CPU 24 turns off the selection signal CTL6, and turns on the selection signal CTL7 as shown by dotted line in FIG. 12. Accordingly, the high reference voltage Vref1 is cut off by the analog switch AS4, and the low reference voltage Vref2 is applied to the A/D converter 20 through the analog switch AS5. Further, the CPU 24 turns on the selection signal CTL8 as shown by dotted line in FIG. 12 so as to turn on the analog switch AS1. Since resistors r1 and r2 are connected in the feedback loop of the amplifier, the gain of the amplifier is decreased by these resistors.

(5) When the sampling signal S3 does not exceed the threshold value Vth3 ("NO"), the state of the selection signals CTL6 to CTL9 is maintained as shown by the solid lines in FIG. 12. That is, the amplifier 2a is set to a high gain state, and the reference voltage is set to the high reference voltage side. Further, the CPU turns on the selection signal CTL9 when the sampling signal S3 does not exceed the threshold value Vth3, or when the amplifier is set to the low gain. When the selection signal CTL9 is turned on, the analog switch AS2 is turned off and the analog switch AS3 is turned on.

Accordingly, the sample/hold circuit (S/H) 19 is connected to the A/D converter 20 through the analog switch AS3.

We claim:

1. An article detection device comprising:
   light emission means for emitting a detection light for irradiation onto an article;
   light reception means for receiving a reflected light from the article;
   an analog-to-digital converter coupled to the light reception means, for converting the reflected light to a digital signal;
   a first register coupled to the analog-to-digital converter, for storing the digital signal after being sampled using a first sampling signal having a first period;
   a second register coupled to the analog-to-digital converter, for storing the digital signal after being sampled using a second sampling signal having a second period shorter than the first period; and
   control means for generating the first and second sampling signal to be provided to the first and second registers, reading the digital signal stored in the first and second registers, calculating a difference between the digital signals in the first register and the second register, comparing an absolute value of the difference with a predetermined threshold value, and detecting an article when the absolute value is larger than the threshold value.

2. An article detection device as claimed in claim 1, further comprising:
   an alternating amplifier connected to the light reception means, for amplifying the reflection light to provide an alternating signal;
   sample/hold means connected between the AC-amplifier and the A/D converter for sampling and holding the alternating signal provided by the AC-amplifier; and
   modulating means for generating a pulse modulation signal to a drive unit which pulse-drives the light emission means,
   wherein the control means further generates first, second and third control signals to be to control the modulation means, the sample/hold means, and the A/D converter, respectively.

3. An article detection device as claimed in claim 1, wherein the control means comprises:
   storage means for storing first and second numbers of sampling times for the first and second sampling signals, and storing the threshold value comprised of first and second threshold values.

4. An article detection device as claimed in claim 2, wherein the sample/hold means comprises:
   a maximum sample/hold circuit for sampling and holding a maximum value of the alternating signal,
   a minimum sample/hold circuit for sampling and holding a minimum value of the alternating signal, and
   a differential amplifier for amplifying a difference between an output of the maximum sample/hold circuit and an output of the minimum sample/hold circuit.

5. An article detection device as claimed in claim 4, wherein the sample/hold means further comprises:
   first delay means for delaying a first sampling signal, and
   second delay means for delaying a second sampling signal, the first sampling signal being input to the maximum sample/hold circuit, and the second sampling signal being input to the minimum sample/hold circuit.

6. An article detection device as claimed in claim 1, further comprising:
   difference calculation means having a differential amplifier for calculating a difference between a background reflected light and a lower limitation level to provide resultant data, the background reflected light being detected from the background of an article, and the lower limitation level being adjusted in accordance with an intensity of the background reflected light in an adjusting mode; and
   detection means for detecting a change in the amount of light based on the resultant data to eliminate the influence of the background reflected light.

7. An article detection device as claimed in claim 6, wherein the intensity of the background reflected light is determined by a reference reflection face having a predetermined reflection rate.

8. An article detection device as claimed in claim 6, wherein the detection means comprises:
   a sample/hold circuit coupled to the differential amplifier, for sampling and holding an output of the differential amplifier, to provide an output,
   an adjusting circuit for adjusting the lower limitation level, to provide an output,
   a first A/D converter coupled to the differential amplifier, for converting an output of the differential amplifier to a digital value,
   a second A/D converter coupled to the sample/hold circuit, for converting the output of the sample/hold circuit to a digital value, and
   a third A/D converter coupled to the adjusting circuit, for converting the output of the adjusting circuit to a digital value.

9. An article detection device as claimed in claim 1, wherein the light reception means receives ambient light, further comprising:
   an amplifier coupled to the light reception element;
   adjusting means for adjusting a gain of the amplifier; and
   reference voltage generation means for generating first and second reference voltages to be supplied to the amplifier, wherein the adjustment of the gain of the amplifier is performed so that, when the ambient light does not exceed a predetermined threshold level, the first reference voltage is selected and the gain is adjusted to a high level side, and when the ambient light exceeds a predetermined threshold level, the second reference voltage is selected and the gain is adjusted to a low level side.

10. An article detection device as claimed in claim 9, wherein the adjusting means comprises:
    a first analog switch coupled to the amplifier, for switching the gain between the high level side and the low level side,
    second and third analog switches for switching the detection light between the ambient light and the light reflected from an article, and
    fourth and fifth analog switches coupled to the reference voltage generation means, being used for switching the reference voltage between the first and the second reference voltages, wherein the switching of each of the first, second, third, fourth and fifth analog switches is performed by respective first, second, third, fourth and fifth selection signals generated by the control means.

11. An article detection device as claimed in claim 1, 3 or 10, wherein the control means comprises a microprocessor.

12. A method for detecting an article, comprising the steps of:
   a) emitting a detection light for irradiation onto an article;
   b) receiving a reflected light from the article;
   c) converting the reflected light to a digital signal;
   d) storing the digital signal in a first register after being sampled using a first sampling signal generated by a control unit and having a first period;
   e) storing the digital signal in a second register after being sampled using a second sampling signal generated by the control unit, and having a second period shorter than the first period;
   f) reading the digital signal stored in the first and second registers;
   g) calculating a difference between the digital signals in the first register and the second register;
   h) comparing an absolute value of the difference with a first predetermined threshold value; and
   i) detecting the article when the absolute value is larger than the first predetermined threshold value.

13. A method for detecting an article as claimed in claim 12, further comprising the step of:
   j) not detecting the article when the absolute value is not larger than a second threshold value.

14. A method for detecting an article as claimed in claim 13, further comprising the steps of:
   k) checking whether a number of sampling times reaches a predetermined number of times when the absolute value is smaller than the first threshold value, and
   l) returning to said step
   (a) based on said step (k).

15. A method for detecting an article as claimed in claim 13, further comprising the steps of:
   k) checking whether a number of sampling times reaches a predetermined number of times reaches a predetermined number of times when the absolute value is larger than the second threshold value,
   l) returning to said step (f) when the number of sampling times does not reach a predetermined number of times, and
   m) not detecting the article when the absolute value is smaller than the second threshold value or when the number of sampling times reaches a predetermined number of times.

16. A method for detecting an article as claimed in claim 12, further comprising the steps of:
   j) setting first and second reference voltages;
   k) detecting an ambient light before detecting the article;
   l) comparing the ambient light with a second predetermined threshold value;
   m) adjusting a gain of an amplifier in accordance with the ambient light; and
   n) switching between the first and second reference voltages based on said step (m).

17. A method for detecting an article as claimed in claim 12, further comprising the steps of:
   j) calculating a difference between a background reflected light and a lower limitation level in an adjusting mode, to provide resultant data; and
   k) detecting a change in an amount of light based on the resultant data of said step (j) to eliminate an influence of the background reflected light.

18. An article detection device for detecting an article in a portion of an environment, comprising:
   a light emission element which provides a detection light based on a drive signal;
   a drive unit coupled to the light emission element, which receives a modulated signal and which provides the drive signal based on the modulated signal;
   a modulation unit coupled to the drive unit, which receives a first control signal and which provides the modulated signal based on the first control signal;
   a light reception element which receives a reflected light and which provides a light reception signal based on the reflected light;
   an amplifier coupled to the light reception element, which receives the light reception signal and which provides an amplified signal based on the light reception signal;
   a sample/hold unit coupled to the amplifier, which receives the amplified signal and a second control signal, and which provides a sample/hold signal based on the amplified signal and the second control signal;
   an A/D converter coupled to the sample/hold unit, which receives the sample/hold signal and a third control signal, and which provides a converted signal based on the sample/hold signal and the third control signal;
   a first register coupled to the A/D converter, which receives the converted signal and a fourth control signal, and which provides a first data signal based on the converted signal and the fourth control signal;
   a second register coupled to the A/D converter, which receives the converted signal and a fifth control signal, and which provides a second data signal based on the converted signal and the fifth control signal; and
   a control unit coupled to the modulation unit, the sample/hold unit, the A/D converter, the first register and the second register, which generates the first, second, third, fourth and fifth control signals, which reads the first and second data signals, which calculates a difference between the first and second data signals, which compares an absolute value of the difference with a predetermined threshold value, and which detects the article in the portion of the environment when the absolute value is larger than the threshold value.

* * * * *